(12) United States Patent
Chou

(10) Patent No.: US 7,622,780 B2
(45) Date of Patent: Nov. 24, 2009

(54) SEEK-SCAN PROBE (SSP) INCLUDING SEE-SAW SCAN PROBE WITH REDUNDANT TIP

(75) Inventor: Tsung-Kuan Allen Chou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 11/644,650

(22) Filed: Dec. 21, 2006

(65) Prior Publication Data

US 2008/0148879 A1 Jun. 26, 2008

(51) Int. Cl.
*H01L 27/14* (2006.01)
(52) U.S. Cl. .................. 257/414; 257/415; 257/448; 438/52
(58) Field of Classification Search .............. 257/254, 257/763, 415, 414, 737, 428, 431, 443, 448; 438/97, 52, 20, 48, 50, 57
See application file for complete search history.

(56) References Cited

U.S. PATENT DOCUMENTS

| | | | |
|---|---|---|---|
| 5,260,926 A * | 11/1993 | Kuroda et al. | 369/100 |
| 6,995,368 B2 | 2/2006 | Wen et al. | |
| 7,176,457 B2 | 2/2007 | Wen et al. | |
| 2006/0228873 A1 * | 10/2006 | Liu et al. | 438/496 |
| 2006/0289954 A1 | 12/2006 | Bar-Sadeh et al. | |
| 2008/0012094 A1 | 1/2008 | Ma et al. | |
| 2008/0105937 A1 | 5/2008 | Bar-Sadeh et al. | |
| 2008/0237755 A1 | 10/2008 | Chou | |
| 2008/0309191 A1 | 12/2008 | Chou et al. | |
| 2009/0001486 A1 | 1/2009 | Heck et al. | |
| 2009/0002887 A1 | 1/2009 | Chou et al. | |
| 2009/0040911 A1 | 2/2009 | Chou et al. | |

* cited by examiner

*Primary Examiner*—Brook Kebede
*Assistant Examiner*—Mark A Laurenzi, III
(74) *Attorney, Agent, or Firm*—Blakely, Sokoloff, Taylor & Zafman LLP

(57) ABSTRACT

An apparatus comprising a substrate having a probe suspension formed thereon, a see-saw probe coupled to the probe suspension, the see-saw probe including first and second ends, with a tip projecting from a side of the first end, and an actuation electrode formed on the substrate, the actuation electrode positioned to exert a force upon the second end of the see-saw probe. A process comprising forming a probe suspension on a substrate, coupling a see-saw probe to the probe suspension, the see-saw probe including first and second ends, with a tip projecting from a side of the first end, and forming an actuation electrode on the substrate, the actuation electrode positioned to exert a force upon the second end of the see-saw probe.

17 Claims, 7 Drawing Sheets

SEEK-SCAN PROBE (SSP) INCLUDING SEE-SAW SCAN PROBE WITH REDUNDANT TIP

TECHNICAL FIELD

Embodiments of the present invention relate generally to micro-electro-mechanical systems (MEMS) and in particular, but not exclusively, to seek-scan probe (SSP) memories including a see-saw probe with redundant tips.

BACKGROUND

Conventional solid state memories employ micro-electronic circuit elements for each memory bit. Since one or more electronic circuit elements are required for each memory bit (e.g., one to four transistors per bit), these devices can consume considerable chip "real estate" to store a bit of information, which limits the density of a memory chip. The primary memory element in these devices is typically a floating gate field effect transistor device that holds a charge on the gate of field effect transistor to store each memory bit. Typical memory applications include dynamic random access memory (DRAM), synchronous random access memory (SRAM), erasable programmable read only memory (EPROM), and electrically erasable programmable read only memory (EEPROM).

A different type of memory commonly known as a seek-scan probe (SSP) memory uses a non-volatile storage media as the data storage mechanism and offers significant advantages in both cost and performance over conventional memories based on charge storage. Typical SSP memories have storage media made of materials that can be electrically switched between two or more states having different electrical characteristics such as resistance or polarization dipole direction. One type of SSP memory, for example, uses a storage media made of a phase change material that can be electrically switched between a generally amorphous phase and a generally crystalline local order, or between different detectable phases of local order across the entire spectrum between completely amorphous and completely crystalline phases.

SSP memories are written to by passing an electric current through the storage media or applying an electric field to the storage media. Passing a current through the storage media is typically accomplished by passing a current between a sharp probe tip on one side of the storage media and an electrode on the other side of the media. Current SSP memories use probe tip positioned on the free end of a cantilever beam. In an idle state the cantilever beam maintains the probe tip at a certain distance above the storage media, but before the electric field or current can be applied to the storage media the probe tip must usually be brought close to, or in some cases in direct contact with, the storage media.

To bring the probe tip close toward the storage media, the cantilever beam must be deflected such that its free end moves toward the storage media. This is usually accomplished by applying a voltage to the same electrodes that underlie the storage media; when a voltage is applied, the electric field created by the electrode exerts a force on the cantilever beam that deflects the end of the beam toward the electrode. A disadvantage of this approach is that the stiffness of the cantilever beam requires a substantial force for deflection. As a result, a substantial actuation voltage must be applied to the electrodes to actuate the probe. Unfortunately, the voltage that can be applied to the electrodes without damaging them or affecting the storage media is limited, meaning that only a limited deflection of the cantilever is possible or, in cases where the probe tip contacts the storage media, the probe can exert only a limited force on the storage media. In addition, the sense electrode under storage media requires a fixed voltage (usually grounded), which prevents an actuation voltage to be used on the same electrode.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for micro-electro-mechanical (MEMS) seek-scan probe (SSP) memories including a see-saw scan probe with redundant tips are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1A:
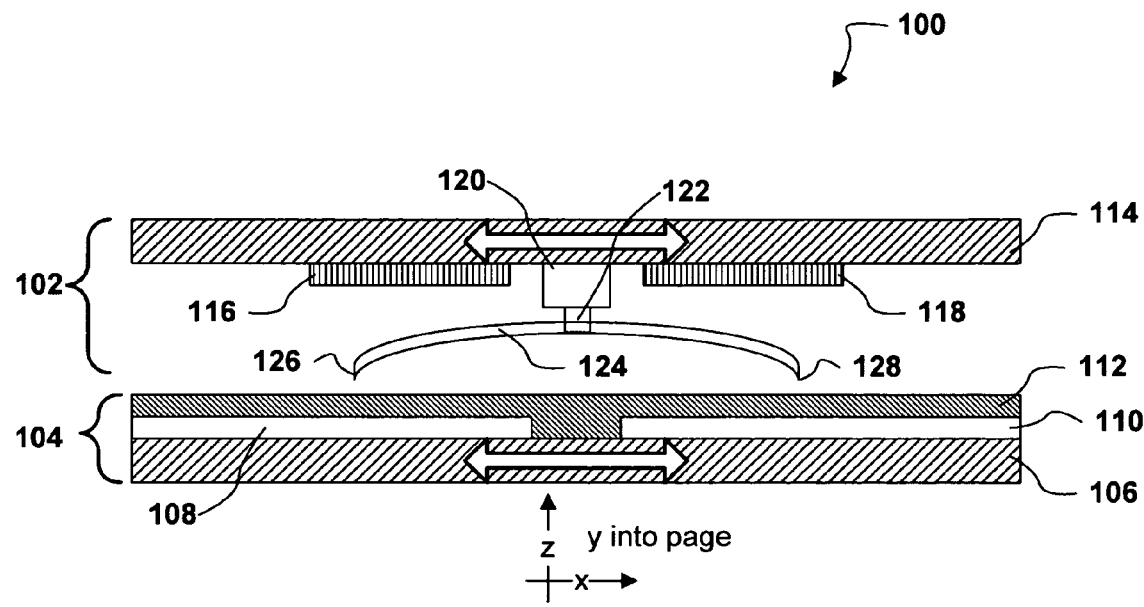
FIG. 1A is a side elevation of an embodiment of a micro-electro-mechanical (MEMS) seek-scan probe memory.
Figure 1B:
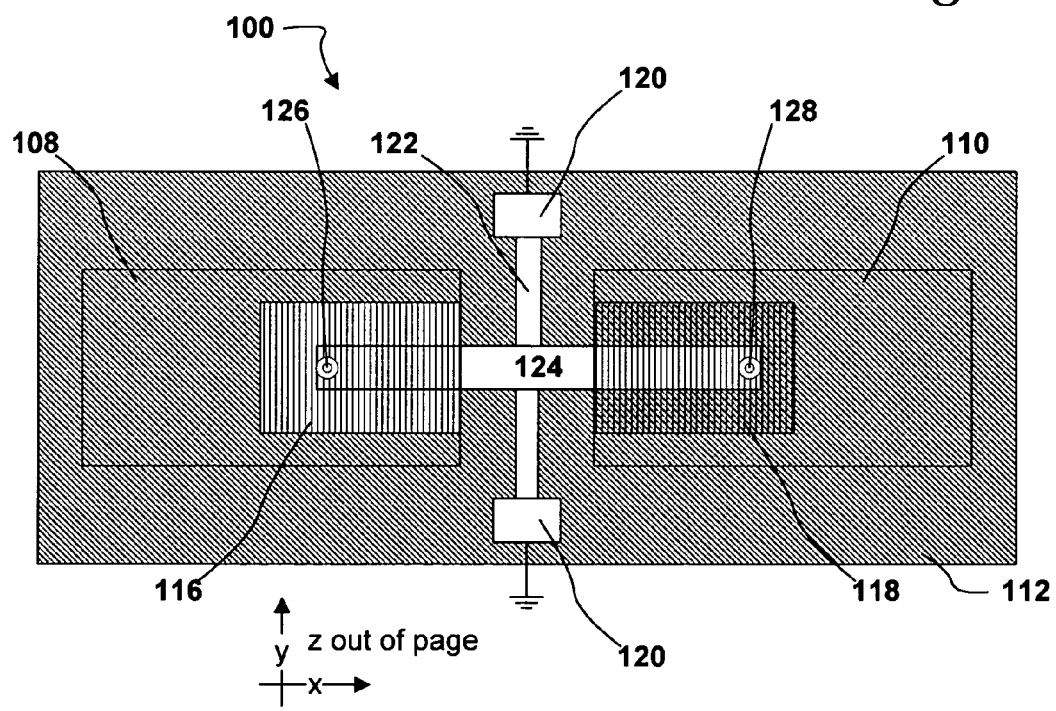
FIG. 1B is a plan view of the embodiment of the seek-scan probe memory shown in FIG. 1A.

FIGS. 1A and 1B together illustrate an embodiment of a micro-electro-mechanical (MEMS) seek-scan probe (SSP)

memory 100; FIG. 1A shows a side elevation, while FIG. 1B shows a plan view in which substrate 114 has been removed. Memory 100 is made up of two stages: first stage 102 and second stage 104. Second stage 104 is positioned facing first stage 102 and is spaced apart from first stage 102 by a distance that allows probe tips 126 and 128 to contact storage media 112 when the probe is activated (see FIG. 4). In some embodiments, first stage 102 and second stage 104 are built separately and then assembled to form memory 100. Moreover, in the illustrated embodiment first stage 102 is positioned above second stage 104, but in other embodiments the arrangement shown can be inverted so that second stage 104 is positioned above first stage 102.

First stage 102 and second stage 104 can move relative to each other, for example in the x-y plane as shown by the arrows in substrates 104 and 114. In one embodiment, second stage 104 is stationary and first stage 102 moves, but in other embodiments first stage 102 can be stationary and second stage 104 can move, and in still other embodiments both first stage 102 and second stage 104 can move. In different embodiments, the relative motion of first stage 102 and second stage 104 can be driven by electrostatic or electromagnetic MEMS components such as comb drives or magnetic actuators.

First stage 102 includes a substrate 114 on which are formed a pair of anchors 120. A torsion beam 122 is coupled to both anchors 120 and is suspended by the anchors, while see-saw probe 124 is coupled to torsion beam 122. A first actuation electrode 116 and a second actuation electrode 118 are formed on substrate 114 and are positioned so that, when activated by applying a voltage, they will exert a force on the corresponding ends of see-saw probe 124. Details of each component of first stage 102 are discussed below; operation of memory 100 is described below in connection with FIG. 4.

Substrate 114 can be any kind of substrate compatible with MEMS manufacturing requirements and whose properties are consistent with the construction of memory 100. In one embodiment substrate 114 can be one or more of the various forms of silicon, such as polysilicon, single-crystal silicon, and the like. In other embodiments, substrate 114 can be made of different materials, for example Silicon Germanium ($Si_xGe_y$). In still other embodiments, substrate 114 can be a composite made up of combinations of materials or layers of different materials.

Anchors 120 and torsion beam 122 together form a probe suspension system that supports see-saw probe 124. Anchors 120 and torsion beam 122 can be formed on substrate 114 using techniques such as photolithographic patterning and etching, in which the required materials are deposited on substrate 114 and then patterned and etched to form the anchors and the torsion beam. In the embodiment shown, anchors 120 are simple cubical pedestals formed on substrate 114, although in other embodiments the anchors may have a different design. Moreover, the illustrated embodiment uses two anchors 120, but in other embodiments a different number of anchors can be used.

Torsion beam 122 is coupled to both anchors 120 and extends between, and is suspended and/or supported by, both anchors. Torsion beam 122 is designed so that it has a relatively low torsional spring constant k about its longitudinal axis, so that see-saw probe 124 will be able to rotate through a limited angle about the longitudinal axis. To prevent rotation of see-saw probe 124 in the plane of substrate 114 and the corresponding lateral movement of probe tips 126 and 128, torsion beam 122 is designed to have a relatively high torsional spring constant k in directions other than along its longitudinal axis. The illustrated embodiment of torsion beam 122 shown is a simple straight beam with a uniform square cross-section, but in other embodiments (see, e.g., FIG. 2A) the torsion beam may have a different construction, which can include a different shape, different cross-section, or both.

Materials that can be used to form anchors 120 and torsion beam 122 include the various forms of silicon, such as polysilicon, single-crystal silicon, and the like. In other embodiments, the anchors and torsion beam can be made of different materials, for example Silicon Germanium ($Si_xGe_y$). In still other embodiments, anchors 120 and torsion beam 122 can be a composite made up of combinations of materials or layers of different materials. In the illustrated embodiment anchors 120 and torsion beam 122 are shown as being made of the same material, but in other embodiments the anchors can be made of a different material than the torsion beam, so long as the chosen combination of materials is compatible with processing requirements.

See-saw probe 124 is coupled to torsion beam 122 and can rotate about the longitudinal axis of the torsion beam. The see-saw probe includes a tip 126 projecting from a location at or near a first end of the probe, and a tip 128 projecting from a location at or near a second end of the probe. The illustrated embodiment shows the see-saw probe with a substantially rectangular shape in plan view and a curved profile when viewed from the side. The illustrated curved shape in side view is a result of residual stresses resulting from the manufacturing process. In other embodiments, however, the see-saw probe 124 need not have a rectangular shape (see, e.g., FIG. 2B) and need not have a curved profile. An alternative embodiment of the see-saw probe could, for example, have a beam with a straight profile or a beam having a V-shaped profile with the apex of the V coupled to torsion beam 122. Materials that can be used to form see-saw probe 124, along with its tips 126 and 128, include the various forms of silicon, such as polysilicon, single-crystal silicon, and the like. In other embodiments, the anchors and torsion beam can be made of different materials, for example Silicon Germanium ($Si_xGe_y$). In still other embodiments, see-saw probe 124 can be a composite made up of combinations of materials or layers of different materials.

In the embodiment shown, see-saw probe 124 is coupled to torsion beam 122 such that a longitudinal axis of the see-saw probe is substantially normal to the longitudinal axis of the torsion beam, although in other embodiments the longitudinal axes of the see-saw probe and the torsion beam need not be substantially normal. The illustrated embodiment also shows torsion beam 122 substantially bisecting see-saw probe 124; in other words, approximately half the see-saw probe is on one side of the torsion beam and half on the other side; for a see-saw probe with a uniform cross-sectional shape, this results in a see-saw probe that is balanced (i.e., there is approximately equal mass on either side of the torsion beam). In other embodiments, however, the torsion beam need not bisect the see-saw probe (see, e.g., FIG. 2C) and the probe mass on either side of the torsion beam need not be equal. In yet another embodiment, the torsion beam does not bisect the see-saw probe (i.e., there is more of the probe on one side of the torsion beam than on the other), but the see-saw probe is balanced by adding a counterbalance weight (see, e.g., FIG. 2D).

Actuation electrodes 116 and 118 are formed on opposite sides of the beam suspension by depositing, patterning and etching. Actuation electrodes 116 and 118 can be made using any kind of electrically conductive material compatible with the voltage requirements for actuation and also compatible with the process requirements for making memory 100. In one embodiment, for example, actuation electrodes 116 and 118 can be made of a metal, while in other embodiments the actuation electrodes can be made of conductive non-metals such as doped polysilicon.

Second stage 304 includes a substrate 106 having a layer of storage media 112 deposited thereon. Sandwiched between substrate 106 and storage media 112 are a pair of read/write/erase (R/W/E) sense electrodes including first electrode 108 and second electrode 110. As with substrate 114 of first stage 102, substrate 106 can be any kind of substrate compatible with MEMS manufacturing requirements and with properties consistent with the construction process of memory 100. In one embodiment substrate 106 can be one or more of the various forms of silicon, such as polysilicon, single-crystal silicon, and the like. In other embodiments, substrate 106 can be made of different materials, for example Silicon Germanium ($Si_xGe_y$). In still other embodiments, substrate 106 can be a composite made up of combinations of materials or layers of different materials.

Storage media 112 is deposited on substrate 106 and electrodes 108 and 110 such that the electrodes are sandwiched between the storage media 112 and substrate 106. In the resulting structure, the parts of storage media 112 that overlie the R/W/E sense electrodes 108 and 110 form the memory cells to which information can be written or read by see-saw probe 124. In one embodiment, storage media 112 can be a chalcogenide material in which a temperature change induced in the material by a current passed between a probe tip and an R/W/E sense electrode causes a small region in the material to change from a first phase with a given electrical conductivity to a second phase with a different electrical conductivity. The resulting small region with a different electrical conductivity then represents a data bit. In another embodiment, the storage media can be a ferroelectric material wherein the polarization of a small region of the material changes in response to an electric field between a probe tip and an R/W/E electrode. In still another embodiment, the storage media can be a polymer material with a relatively low melting point, such that when a probe tip is pressed against the material and a current is passed between the probe and an R/W/E electrode, a hole is melted into the polymer. The hole then represents a data bit.

Read/Write/Erase sense electrodes 108 and 110 are deposited and patterned on substrate 106 before deposition of storage media 112. Electrodes 108 and 110 can be made on any kind of electrically conductive material compatible with storage media 112 and also compatible with the process requirements for making memory 100. In one embodiment, for example, the electrodes can be made of a metal, while in other embodiments electrodes 108 and 110 can be made of conductive non-metals such as doped polysilicon.

Figure 2A:
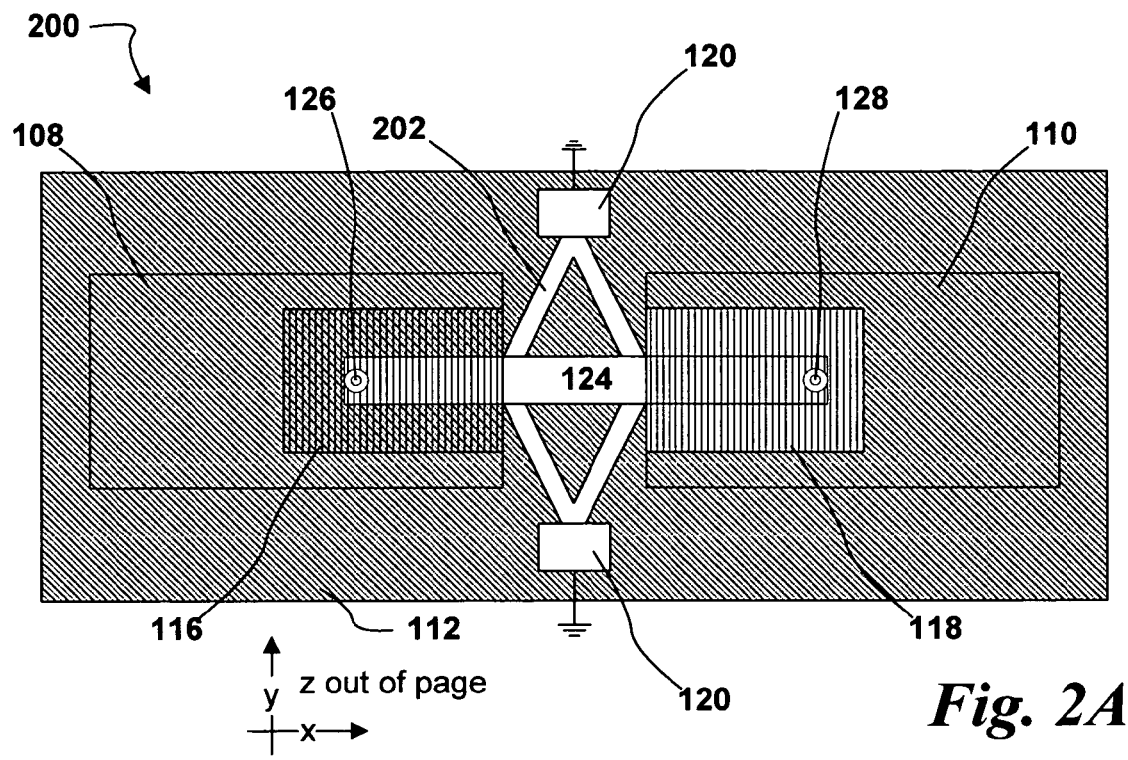
FIG. 2A is a plan view of an alternative embodiment of a seek-scan probe memory.

FIGS. 2A-2D illustrate various alternative embodiments of memory 100 shown in FIGS. 1A-1B. FIG. 2A illustrates an embodiment of an SSP memory 200 having a different torsion beam structure than the torsion beam in memory 100. In memory 200, torsion beam 202 is a multi-element beam. On each side of see-saw probe 124 a pair of beam branches come together at one end to form a V-shape; thus, the overall torsion beam 202 is approximately shaped like a rhombus. The apex of each V-shaped side of the beam where the two elements come together is coupled to an anchor 120, while the opposite end of each branch of the V is coupled to see-saw probe 124. This embodiment of the torsion beam is useful for situations in which there is undesired in-plane torque, since it provides a substantially higher torsional spring constant k to resist in-plane torque while having a low enough torsional spring constant about its own axis to allow see-saw probe 124 to rotate about that axis.

Figure 2B:
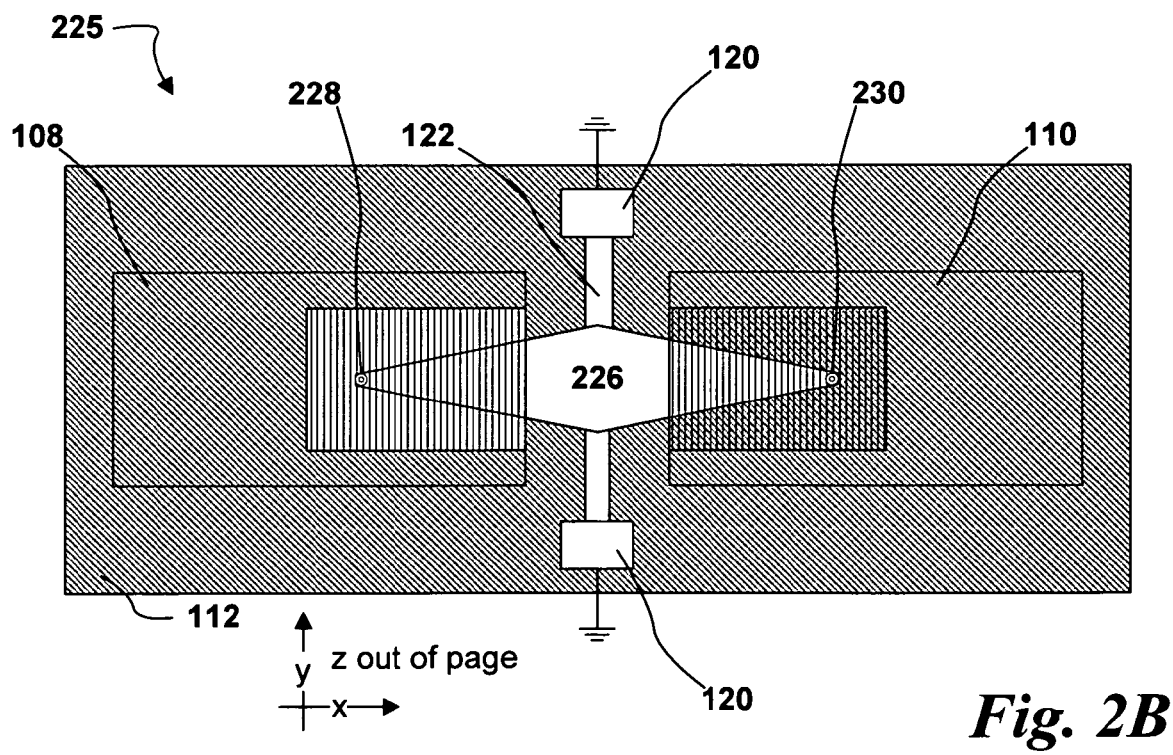
FIG. 2B is a plan view of another alternative embodiment of a seek-scan probe memory.

FIG. 2B illustrates an alternative embodiment of an SSP memory 225. Memory 225 is similar to memory 100 and includes substantially the same elements, the principal difference being the shape of the see-saw probe. In memory 100, see-saw probe has a substantially uniform width when seen in a plan view. By contrast, in memory 225 see-saw probe 226 is tapered. In the embodiment shown, see-saw probe 226 has a double taper: it is widest approximately at its middle where it is coupled to torsion beam 122 and it tapers from its middle to each end where tips 228 and 230 are located. A tapered see-saw probe as shown can be useful for adjusting the mass distribution of the probe, thus enhancing responsiveness during operation.

Figure 2C:
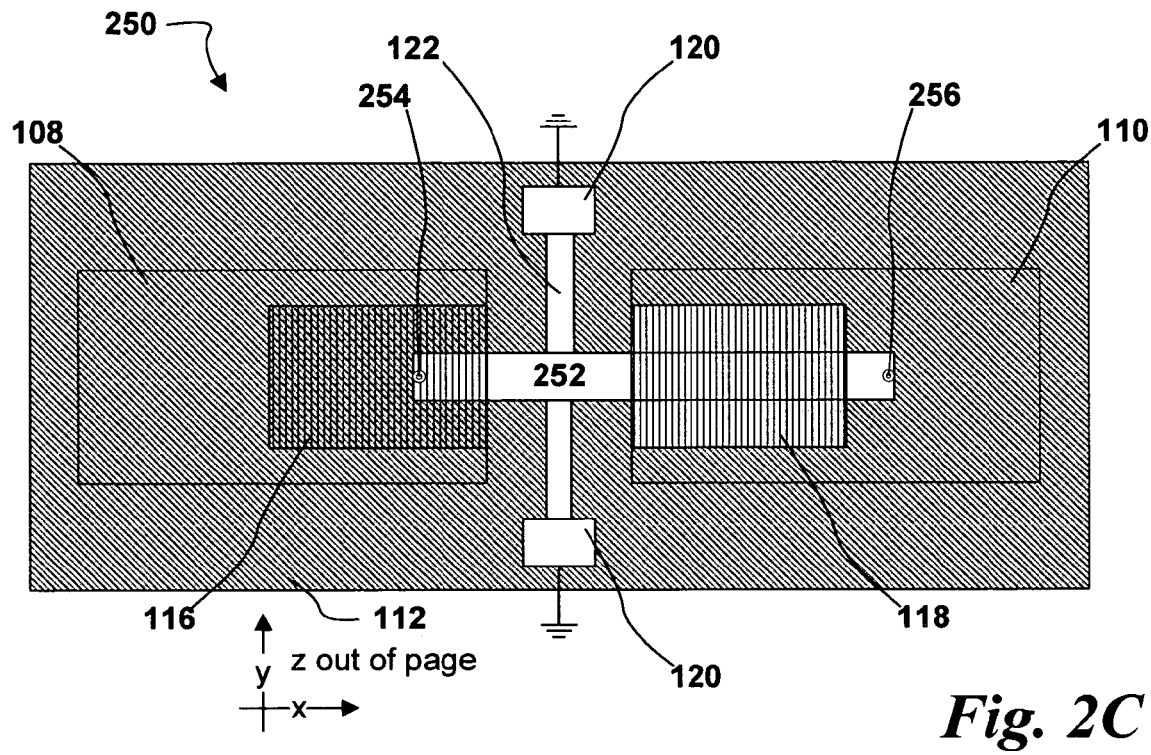
FIG. 2C is a plan view of still another alternative embodiment of a seek-scan probe memory.

FIG. 2C illustrates an alternative embodiment of an SSP memory 250. Memory 250 is similar to memory 100 and includes substantially the same elements, the principal difference being the coupling of the see-saw probe to the torsion beam. In memory 100, see-saw probe 124 is coupled to torsion beam 122 such that the torsion beam substantially bisects the see-saw probe (i.e., such that the see-saw probe is substantially symmetrical about the torsion beam). By contrast, in memory 250 the see-saw probe 252 is asymmetrically coupled to torsion beam 122, such that torsion beam 122 doesn't bisect see-saw probe 252. As a result, there is a greater portion of the see-saw probe on one side of the torsion beam than the other and tip 254 is closer to the torsion beam than tip 256. Such an asymmetrical see-saw probe can be useful when a longer tip vertical displacement than the actuation probe displacement on the other side is needed. For example, a small pull-down displacement of probe 254 from actuation will produce a large pull-up displacement of probe 256 to memory 304.

Figure 2D:
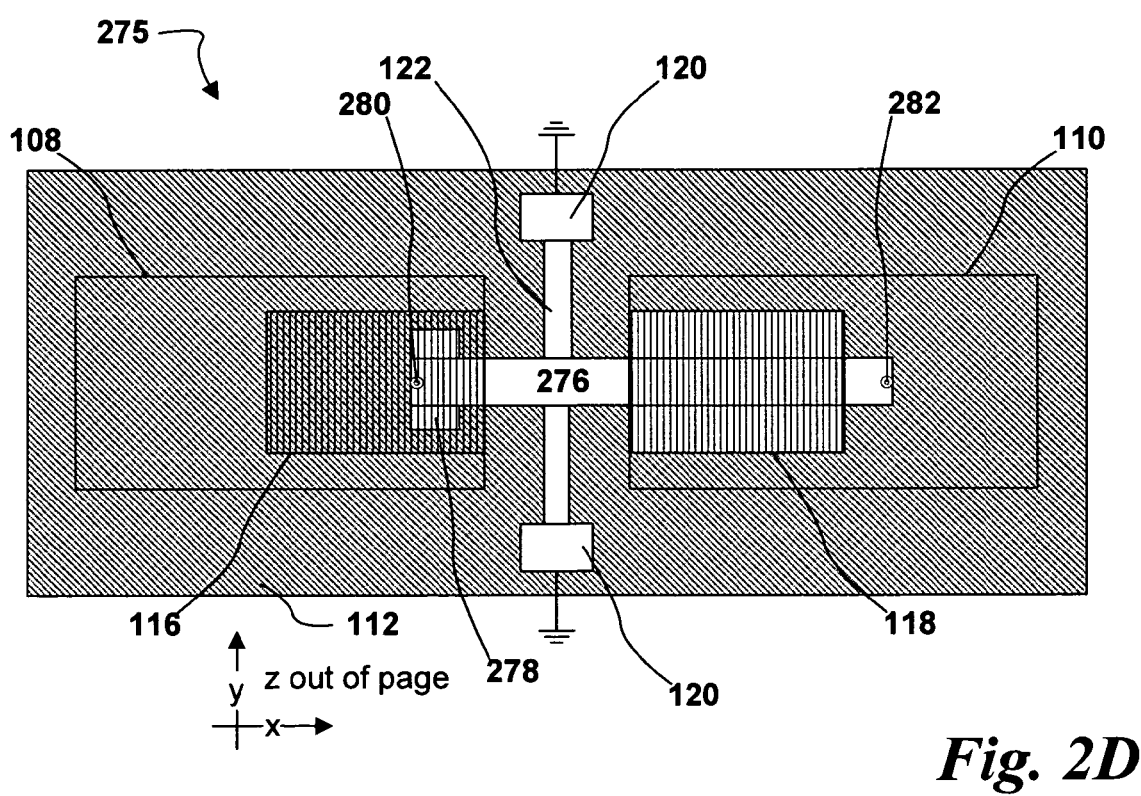
FIG. 2D is a plan view of yet another alternative embodiment of a seek-scan probe memory.

FIG. 2D illustrates an alternative embodiment of an SSP memory 275. Memory 275 is similar to memory 250 in that see-saw probe 276 is asymmetrically coupled to torsion beam 122, such that there is a greater portion of the see-saw probe on one side of the torsion beam than the other and tip 280 is closer to the torsion beam than tip 282. In contrast to memory 250, however, see-saw probe 276 includes a counterbalance mass 278 on one end. The function of counterbalance mass 278 is to balance see-saw probe 276 despite its asymmetric coupling to torsion beam 122. Meanwhile, with increase of electrode of probe 280, the see-saw actuation voltage can be reduced.

Figure 3A:
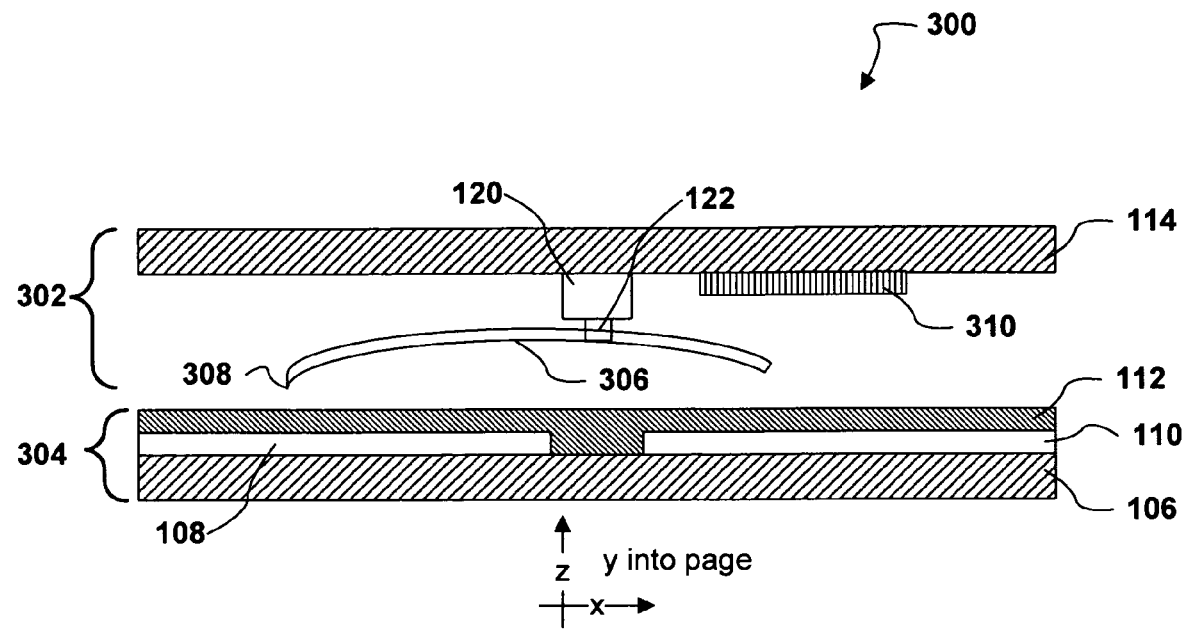
FIG. 3A is a side elevation of another alternative embodiment of a seek-scan probe memory.
Figure 3B:
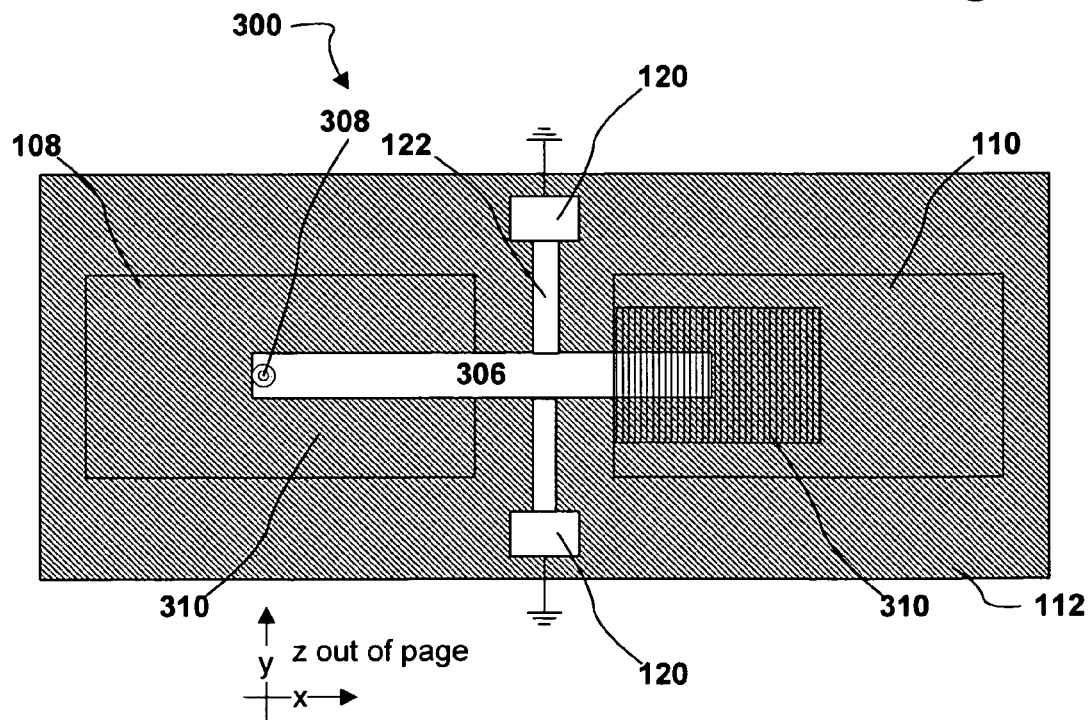
FIG. 3B is a plan view of the embodiment of a seek-scan probe memory shown in FIG. 3A.

FIGS. 3A and 3B illustrate yet another alternative embodiment of an SSP memory 300. Memory 300 is in most respects similar to memory 100 shown in FIGS. 1A and 1B. The primary difference between memory 100 and memory 300 is in the construction of the first stage. In memory 100, first stage 102 includes a see-saw probe 124 that has two tips: tip 126 at or near a first end, and tip 128 at or near a second end. For both tips on see-saw probe 124 to be able to read from and write to storage media 112, first stage 102 includes two actuation electrodes, each of which exerts a force on its corresponding end of see-saw probe 124 so that the tip on the opposite end of the see-saw probe can be moved toward or onto storage media 112.

By contrast, in memory 300 first stage 302 includes a see-saw probe 306 that has a tip 308 only at or near a first end. Because see-saw probe 306 includes only one tip on its first end, only one side of the see-saw probe can be used to read from and write to storage media 112. Consequently only one actuation electrode 310 is required and is positioned to exert a force on a second end of see-saw probe 310 so that tip 308 can be moved toward or onto storage media 112. With a one-tipped see-saw probe 306, the see-saw can be designed asymmetrically similar to the structures shown in FIGS. 2C and 2D. Tip 308 is located at the longer side of the see-saw and the actuation electrode is located under the shorter side of the see-saw. With such a configuration, large tip displacements can be achieved with relatively small displacements of the actuation side. As a result, the memory 300 can be designed so that a larger range of variation is allowed in the gap between first stage 302 and second stage 304, which reduces the fabrication requirement and enhances the device performance. Alternatively, numerous one-tipped see-saw probes can be used in an arrangement analogous to that shown in FIGS. 5A and 5B, such that each one-tipped probe is used only in the storage media 112 overlying one R/W/E electrode.

Figure 4:
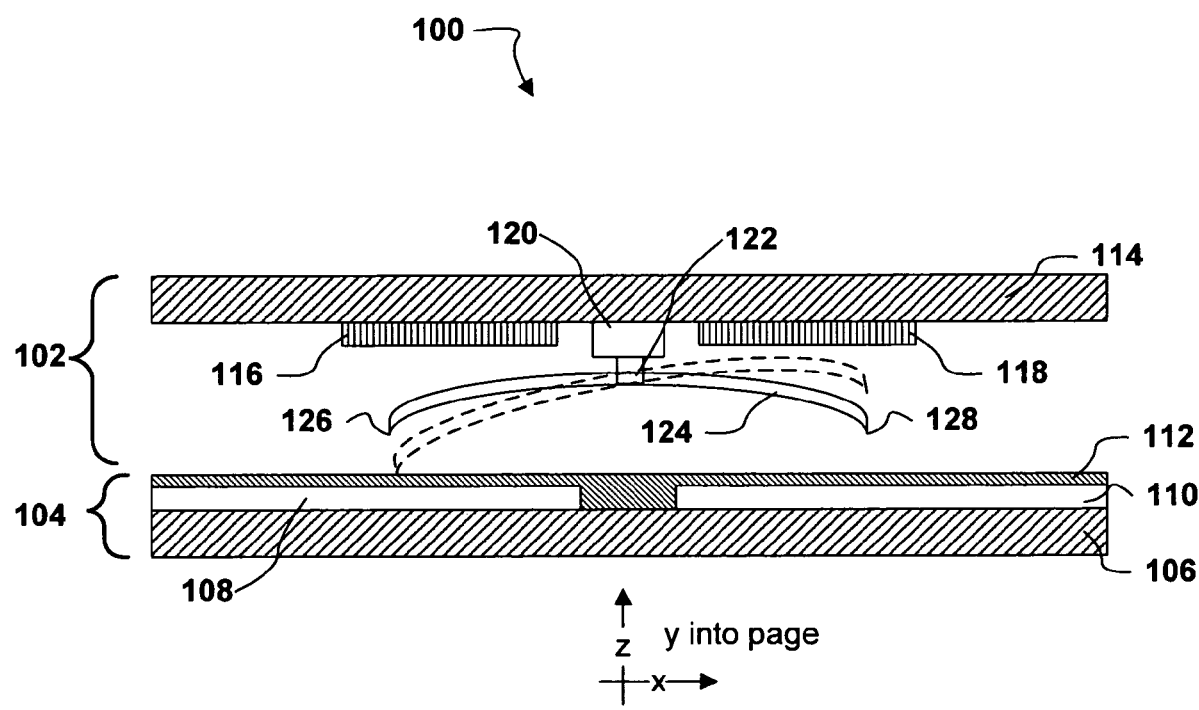
FIG. 4 is a side elevation of the embodiment of a seek-scan probe shown in FIGS. 1A and 1B, illustrating an embodiment of the operation of the seek-scan probe.

FIG. 4 illustrates an embodiment of the operation of an SSP memory such as memory 100 shown in FIGS. 1A and 1B; other illustrated embodiments operate in a similar manner. Before any actuation voltage is applied to actuation electrodes 116 and 118, memory 100 is in an idle state where see-saw probe 124 is balanced and level without tips 126 and 128 contacting storage media 112 (e.g., the tips are a non-zero distance from storage media 112, for example a few micrometers from the storage media in one embodiment). No mechanical stress is imposed on the structure in the idle state. As an initial matter, first stage 102 and second stage 104 are moved relative to each other in a lateral direction so that, when actuation electrodes 116 and 118 are activated, the tips 126 and 128 will read from or write to the desired (x,y) location in storage media 112 overlying R/W/E electrodes 108 and 110.

When first stage 102 and second stage 104 are positioned so that the probe tip being used will read from or write to the desired location in storage media 112, a DC voltage is applied to one of the actuation electrodes. In the embodiment shown, a voltage (e.g., 20V) can be applied to actuation electrode 118, while a voltage of 0V is applied to actuation electrode 116. In other embodiments, other voltages can be applied to the actuation electrodes; the voltage required for actuation will depend on factors such as the gap between the actuation electrode and the see-saw probe. As a result of the voltage applied to electrode 118, the second end of see-saw probe 124 is pulled towards the actuation electrode, such that see-saw probe 124 rotates about the axis of torsion beam 122 and tip 128 moves away from storage media 112. As see-saw probe 124 rotates about torsion beam 122, tip 128 moves away from storage media 112 and tip 126 moves toward storage media 112. In FIG. 4, the solid-line version of see-saw probe 124 illustrates the idle position of the probe, while the dashed-line version illustrates the actuated position of the probe. In a similar manner, when a voltage is applied on the actuation electrode 116, see-saw probe 124 rotates in the opposite direction such that tip 128 is brought closer to, or makes contact with, the storage media over electrode 110.

In some embodiments, when see-saw probe 124 is actuated tip 126 is brought within a specified distance of storage media 112, while in other embodiments tip 126 is brought into physical contact with storage media 112. In embodiments where tip 126 contacts storage media 112, the tip contact force is fully controlled by the actuation voltage applied to actuation electrode 118; by adjusting the voltage applied to actuation electrode 118, the desired contact force on the right contact tip can be controlled. Since torsion beam 122 has low torque spring constant k about its axis but see-saw probe 124 is very stiff about its x, y, and z axes, the electrostatic force applied to the second side of see-saw probe 124 is effectively transferred to tip 126. When tip 126 is in the desired position and within the desired distance of storage media 112, a read/write/erase (R/W/E) signal can be passed through tip 126 to R/W/E sense electrode 108, thus reading, writing or erasing a data bit from storage media 112 overlying electrode 108.

When see-saw probe 124 is actuated, spring energy is stored in torsion beam 122 and when tip 126 contacts storage media 112 spring energy can also be stored in see-saw probe 124, depending on the contact force. After the R/W/E operation, the actuation voltage of electrode 118 is grounded, thus removing the attractive force exerted by actuation electrode 118 on the second side of see-saw probe 124. When the force on the second end is released, the spring energy stored in torsion beam 122 and/or see-saw probe 124 provides a restoring moment that bounces the contact open when actuation voltage is removed. To further accelerate the open force/speed, an actuation voltage can be applied to actuation electrode 116 to pull the contact open even faster.

In memory 100, contact and opening of the probe tip is fully controlled by the voltages on actuation electrodes. There is no need to use sense electrodes on the media, which can simply the media R/W/E electronics. In addition, accurate contact force (especially important for storage media that needs small contact force window, such as 100 nN) can be achieved and is independent from the probe tip height. Close and open speed of the tip contact is more controlled by the actuation voltage, which make the fast switching possible independent from the structure's own resonant frequency.

Figure 5A:
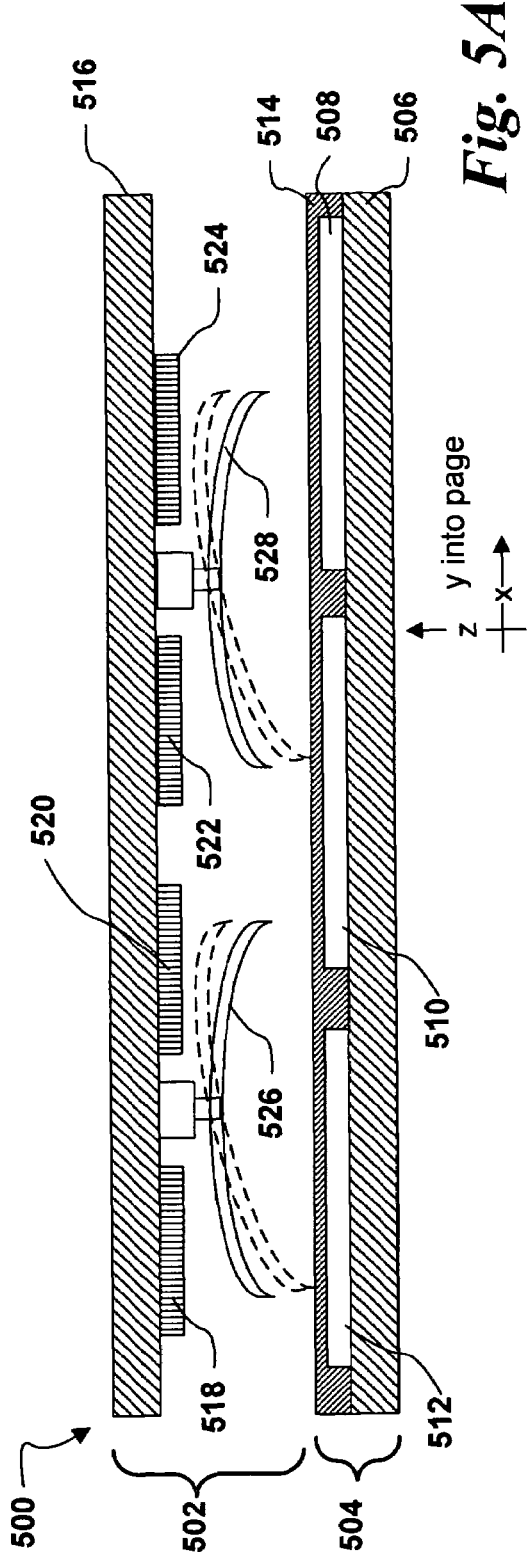
FIGS. 5A and 5B are side elevations of an embodiment of a seek-scan probe memory including multiple seek-scan probes such as the one shown in FIG. 1A.
Figure 5B:
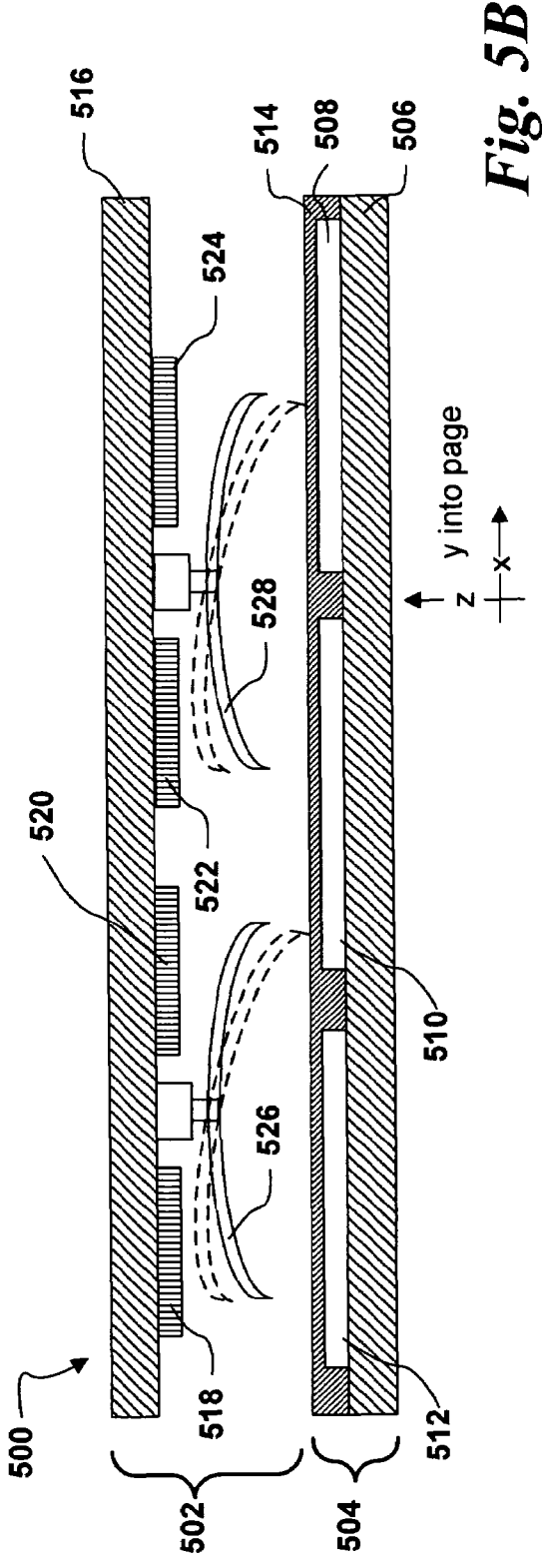

FIGS. 5A and 5B illustrates an embodiment of an SSP memory 500 that includes multiple see-saw probes. Memory 500 takes advantage of the redundant quality of the two-tipped see-saw probe to swap the usage of tip so that device lifetime can be doubled. Memory 500 includes a first stage 502 and a second stage 504 that, as in memory 100, can move laterally relative to each other. First stage 502 includes see-saw probes 526 and 528. See-saw probe 526 has corresponding actuation electrodes 518 and 520, while see-saw probe 528 has corresponding actuation electrodes 522 and 524. Each of see-saw probes 526 and 528 uses its corresponding actuation electrodes to operate substantially as described for memory 100 in FIG. 4 and associated text.

Second stage 504 includes a substrate 506 on which multiple read/write/erase (R/W/E) sense electrodes 508, 510 and 512 are formed. Other embodiments can, of course include a lesser or greater number of R/W/E electrodes, depending in part on the number of see-saw probes used. Deposited over electrodes 508, 510 and 512 is a storage media 514; the portion of the storage media overlying each electrode 508, 510 and 512 represents a memory cell where data can be written, read and erased.

FIG. 5A illustrates a first half of the life cycle of memory 500. The solid-line versions of see-saw probes 526 and 528 illustrate the idle position of the probes, while the dashed-line versions illustrate the actuated positions of the probes. In the first half of the life cycle, only actuation electrodes 520 and 524 are used to actuate the see-saw probes. Thus, probe 526 uses only one of its tips to interact with the storage media overlying R/W/E electrode 512, while probe 524 uses one of its tips to interact with the storage media overlying R/W/E electrode 510.

FIG. 5B illustrates a second half of the life cycle of memory 500. The solid-line versions of see-saw probes 526 and 528 illustrate the idle positions of the probes, while the dashed-line versions illustrate the actuated positions of the probes. When the tips of probes 526 and 528 that were used during the first half of the life cycle are worn to their functional limits, the tips on the opposite ends of each see-saw probe can be used instead by using actuation electrodes 518 and 522 instead of actuation electrodes 520 and 524. Thus, whereas in the first half of the life cycle see-saw probe 526 was used together with the storage media overlying R/W/E electrode 512, in the second half of the life cycle probe 526 is used with the storage media overlying electrode 510. Similarly, whereas in the first half of the life cycle see-saw probe 528 was used together with the storage media overlying R/W/E electrode 510, in the second half of the life cycle probe 528 is used with the storage media overlying electrode 508. Since the swapped tips are fresh to contact, the lifetime of SSP memory 500 is effectively doubled.

Figure 6:
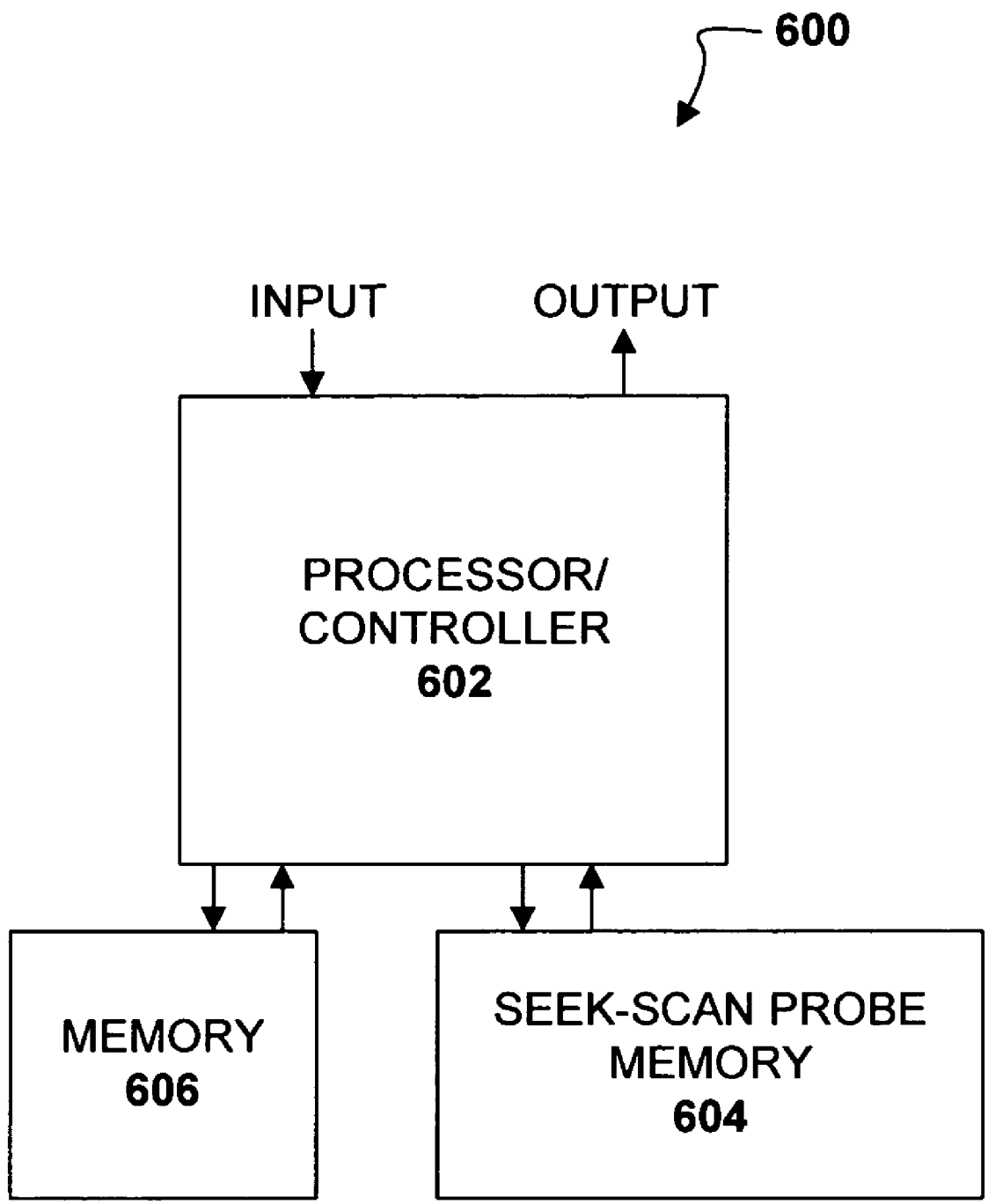
FIG. 6 is a schematic block diagram of an embodiment of a system using one or more embodiments of a phase-change memory such as those shown in FIGS. 1A-1B, 2A-2D, 3A-3B, 4 and/or 5.

FIG. 6 illustrates an embodiment of a system 600 including an embodiment of a seek-scan probe (SSP) memory such as one or more of memories 100, 200, 225, 250, 275, 300 or 500. System 600 includes a processor 602 to which are coupled a memory 606 and an SSP memory 604. Processor 602, in addition to being coupled to memories 604 and 604, has an input and an output through which it can receive data and send data, respectively. In one embodiment processor 602 can be a traditional general-purpose microprocessor, although in other embodiments processor 602 can be another type of processor, such as a programmable controller or an application-specific integrated circuit (ASIC).

Memory 606 can be any type of volatile or non-volatile memory or storage. Volatile memories that can be used in different embodiments of memory 606 include random access memory (RAM), dynamic random access memory (DRAM), synchronous random access memory (SRAM) and synchronous dynamic random access memory (SDRAM), erasable programmable read only memory (EPROM), electrically erasable programmable read only memory (EEPROM), and the like. Non-volatile memories that can be used in different embodiments of memory 606 include magnetic and optical disk drives. SSP memory 604 can, in different embodiments, be a memory such as one or more of memories 100, 200, 225, 250, 275, 300 or 500.

In operation of system 600, processor 602 can receive and send data through its input and output, and can both read and write data to both the memory 606 and the SSP memory 604. Through appropriate software, processor 602 can control the reading, writing and erasure of data in SSP memory 604 by selectively changing the media property (heating phase change or electric dipole formation) in the relevant cell.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
   a first stage comprising:
      a substrate having a probe suspension formed thereon;
      a see-saw probe coupled to the probe suspension, the see-saw probe including first and second ends, with a tip projecting from a side of the first end; and
      an actuation electrode formed on the substrate, the actuation electrode positioned to exert a force upon the second end of the see-saw probe.

2. The apparatus of claim 1 wherein the probe suspension comprises:
   a pair of anchors formed on the substrate; and
   a torsion beam coupled to and supported between the pair of anchors.

3. The apparatus of claim 2 wherein the see-saw probe is coupled to the torsion beam such that the torsion beam substantially bisects the see-saw probe.

4. The apparatus of claim 2 wherein the torsion beam is a straight beam or a multi-branch beam.

5. The apparatus of claim 1 wherein the see saw beam tapers between its midpoint and each of the first and second ends.

6. The apparatus of claim 1, further comprising a second stage including:
   a substrate having a storage media deposited thereon; and
   an electrode formed on the substrate and positioned between the substrate and the storage media.

7. The apparatus of claim 6 wherein the second stage is positioned facing the first stage, such that the tip contacts the storage media overlying the electrode when the actuation electrode is activated.

8. The apparatus of claim 7 wherein the first stage and the second stage move relative to each other.

9. The apparatus of claim 1 wherein the first stage further comprises:
   a tip projecting from a side of the second end of the see-saw probe; and
   an additional actuation electrode formed on the substrate, the additional actuation electrode positioned to exert a force upon the first end of the see-saw probe.

10. The apparatus of claim 9, further comprising a second stage including:
    a substrate having a storage media deposited thereon; and
    first and second electrodes formed on the substrate and positioned between the substrate and the storage media.

11. The apparatus of claim 10 wherein the second stage is positioned facing the first stage, such that the tip on the first end of the see-saw probe contacts the storage media overlying the first electrode when the actuation electrode is activated and the tip on the second end of the see-saw probe contacts the storage media overlying the second electrode when the additional actuation electrode is activated.

12. A system comprising:
    a processor;
    a first memory coupled to the processor, wherein the memory is selected from a group consisting of random access memory (RAM), dynamic random access memory (DRAM), synchronous random access memory (SRAM) and synchronous dynamic random access memory (SDRAM); and
    a second memory coupled to the processor, the second memory comprising:
       a first stage including:
          a substrate having a probe suspension formed thereon,
          a see-saw probe coupled to the probe suspension, the see-saw probe including first and second ends, with a tip projecting from a side of the first end, and
          an actuation electrode formed on the substrate, the actuation electrode positioned to exert a force upon the second end of the see-saw probe; and
       a second stage including:
          a substrate having a storage media deposited thereon, and an electrode formed on the substrate and positioned between the substrate and the storage media, wherein the second stage is positioned facing the first stage, such that the tip contacts the storage media overlying the electrode when the actuation electrode is activated.

13. The system of claim 12 wherein the probe suspension comprises:

a pair of anchors formed thereon; and a torsion beam coupled to and supported between the pair of anchors.

14. The system of claim 12 wherein the first stage and the second stage move relative to each other.

15. The system of claim 12 wherein the first stage further comprises:

a tip projecting from a side of the second end of the see-saw probe; and an additional actuation electrode formed on the substrate, the additional actuation electrode positioned to exert a force upon the first end of the see-saw probe.

16. The system of claim 15 wherein the second stage includes an additional electrode formed on the substrate and positioned between the substrate and the storage media.

17. The system of claim 16 wherein the second stage is positioned facing the first stage, such that the tip on the first end of the see-saw probe contacts the storage media overlying the electrode when the actuation electrode is activated and the tip on the second end of the see-saw probe contacts the storage media overlying the additional electrode when the additional actuation electrode is activated.

* * * * *